US006775687B1

(12) United States Patent
Binding et al.

(10) Patent No.: US 6,775,687 B1
(45) Date of Patent: Aug. 10, 2004

(54) EXCHANGING SUPPLEMENTAL INFORMATION FIELDS BETWEEN A CLIENT AND A SERVER

(75) Inventors: Carl Binding, Thalwil (CH); Stefan Georg Hild, Adliswil (CH); Luke James O'Connor, Adliswil (CH); Sandeep K. Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/415,646

(22) Filed: Oct. 12, 1999

(51) Int. Cl.[7] .............................................. G06F 15/16
(52) U.S. Cl. ...................... 709/203; 709/104; 709/108; 709/203; 709/205; 709/219; 709/224; 707/10; 707/104; 712/27; 713/171; 713/200; 455/556
(58) Field of Search ................................ 709/203, 104, 709/205, 108, 219

(56) References Cited

U.S. PATENT DOCUMENTS

| 5,751,956 | A | * | 5/1998 | Kirsch |
| 5,991,802 | A | * | 11/1999 | Allard et al. |
| 6,006,264 | A | * | 12/1999 | Colby et al. |
| 6,021,439 | A | * | 2/2000 | Turek et al. |
| 6,023,698 | A | * | 2/2000 | Lavey, Jr. et al. |
| 6,058,399 | A | * | 5/2000 | Morag et al. |
| 6,058,423 | A | * | 5/2000 | Factor |
| 6,092,178 | A | * | 7/2000 | Jindal et al. |
| 6,092,196 | A | * | 7/2000 | Reiche |
| 6,128,509 | A | * | 10/2000 | Veijola et al. |
| 6,141,759 | A | * | 10/2000 | Braddy |
| 6,148,405 | A | * | 11/2000 | Liao et al. |
| 6,247,048 | B1 | * | 6/2001 | Greer et al. |
| 6,282,548 | B1 | * | 8/2001 | Burner et al. |
| 6,282,580 | B1 | * | 8/2001 | Chang |
| 6,317,831 | B1 | * | 11/2001 | King |
| 6,397,246 | B1 | * | 5/2002 | Wolfe |
| 6,438,592 | B1 | * | 8/2002 | Killian |

FOREIGN PATENT DOCUMENTS

| EP | 889418 | * | 1/1999 | ........... G06F/17/30 |
| GB | 2331600 | * | 5/1999 | ........... G06F/17/30 |

* cited by examiner

Primary Examiner—Hosain Alam
Assistant Examiner—Young N Won
(74) Attorney, Agent, or Firm—A. Bruce Clay; Marcia L. Doubet

(57) ABSTRACT

A method, system, and computer program product for exchanging supplemental information fields between a client and server. This supplemental information can then be used by the server to complete a client's request for content stored at a particular location. For example, the supplemental information may be used to provide a customized response, or for access control to sensitive data. Preferably, the REDIRECT message of the Hypertext Transfer Protocol (HTTP) or the Wireless Session Protocol (WSP) is used to request the supplemental information, encoding a comma-separated list of attribute names in a request header for the desired supplemental information. This solution is designed to be backward-compatible.

24 Claims, 5 Drawing Sheets

400 Server Process

EXCHANGING SUPPLEMENTAL INFORMATION FIELDS BETWEEN A CLIENT AND A SERVER

BACKGROUND OF THE INVENTION

1. Field of the Invention

The present invention relates to a computer system, and deals more particularly with a method, system, and computer program product for exchanging supplemental information fields between a client and a server using existing communications protocols.

2. Description of the Related Art

It is commonplace today for computer users to connect their machines to other computers, known as "servers," through a network. The network may be a private network, such as a corporate intranet of networked computers that is accessible only to computer users within that corporation, or it may be a virtual private network such as an extranet of computers that is accessible only to computer users having well-established access rights, or it may be a public network, such as the Internet or World-Wide Web. The Internet is a vast collection of computing resources, interconnected as a network, from sites around the world. The World-Wide Web (referred to herein as the "Web") is that portion of the Internet which uses the HyperText Transfer Protocol ("HTTP") as a protocol for exchanging messages. Alternatively, other protocols such as the Wireless Session Protocol ("WSP") can be used, where this protocol is used for wireless communications.

The user working in a networked environment will have software running on his workstation to allow him to create and send requests for information to a server and to receive and view the results. When the user connects to the Web, these functions are typically combined in software that is referred to as a "Web browser," or "browser." After the user has created his request using the browser, the request message is sent out into the Internet for processing. The target of the request message is one of the interconnected servers in the Internet network. That server will receive the message, attempt to find the data satisfying the user's request, format that data for display with the user's browser, and return the formatted response to the browser software running on the user's workstation. The response is typically in the form of a displayable file, referred to as a "Web page," that may contain text, graphics, images, sound, video, etc.

These are examples of a client-server model of computing, where the machine at which the user requests information is referred to as the client, and the computer that locates the information and returns it to the client is the server. In the Web environment, the server is referred to as a "Web server." The user may connect his computer to a server using a "wireline" connection or a "wireless" connection. Wireline connections are those that use physical media such as cables and telephone lines. Wireless connections, on the other hand, use media such as satellite links, radio frequency waves, and infrared waves. The user's computer may be any type of computer processor, including laptops, hand held or mobile computers; vehicle-mounted devices; cellular telephones and desktop screen phones; pagers; desktop computers; mainframe computers; etc., having processing and communication capabilities. The remote server, similarly, can be one of any number of different types of computer which have processing and communication capabilities. A wide variety of server computer capabilities exist including high speed, multiprocessors with extensive real and virtual memory. These concepts are well known in the art, and the hardware devices and software which enable use of these techniques are readily available. Hereinafter, the user's computer will be referred to as a "client device," and use of the terms "client device" or "server" refers to any of the types of computing devices described above.

HTTP, the most widely used communication protocol on the Internet, provides communication capabilities that are basic by design. The HTTP protocol was designed using a simple request-response model where a client issues a request for information, and a server gathers the requested information and sends it back to the requesting client. On the other hand, WSP is emerging as the prevalent communication protocol used for wireless Internet access. WSP is modeled on the HTTP protocol and includes the HTTP functionality, but it is optimized for the wireless environment. (Hereinafter, discussions with reference to HTTP are intended to include WSP unless specifically stated otherwise.) With the skyrocketing growth of the Internet—both in the number of users accessing the Internet, as well as the amount of data transmitted through the Internet—it is advantageous to optimize the interactions between the client and server wherever possible, as well as to provide mechanisms for controlling access to content.

One type of optimization is to have the server provide a customized response to the client (such as not sending data that this client cannot use). The types of information that the server may use in providing customized information depend on the server application. For example, it may be advantageous for the server to know the physical characteristics of the client device. These characteristics may include the size of the client's display, the amount of disk space, and/or the amount of memory on the client device. After acquiring this information from the client, the server can adapt the response based on the size, type, format, or other capabilities/restrictions of the requesting client device, thereby generating a customized response. In the case of a small, handheld device, for example, the server may remove all graphic images from the response if the handheld device is not able to display graphic images. As new types of devices enter the marketplace, the server can be easily adapted to handle the new device characteristics. For example, a small device that has no keyboard but accepts commands from voice input and responds using voice output would likely not be capable of handling any images. The server would preferably customize the response to this device by removing images and responding with text to the client. Or, the server might respond by processing the text file itself using a voice synthesizer, and by sending a media file of the synthesized text for the client device to play.

One type of access control mechanism that may be provided is for the server application to request information prior to even determining whether to respond to the client request. Types of information which the server application may wish to obtain from the client for use in controlling access to content include security-related data (such as session keys, a user's identification, etc.), as well as device characteristics (as described above).

Hereinafter the phrase "supplemental information" will be used to refer to any information which a server may find useful in processing a request from a client.

A challenge in processing client requests is that the information requests are dynamic and typically unpredictable in nature. The server application cannot expect all initial client requests to include the full set of information needed to adequately service the request and/or customize the response. If the server requires additional information which was not included in the initial request from the client, then the server needs to request the additional supplemental information from the client.

There are a vast number of clients and servers in use today, operating according to existing communications protocols. Techniques for exchanging supplemental information between the server and client exist today. A number of problems are associated with these existing approaches, however.

One approach sends one or more error codes from the server to indicate to a client that a supplemental data field must be supplied by the client before the server can respond. These error codes, however, are existing features of the protocol which are then overloaded with new semantics for the supplemental data exchange. The obvious problem with this approach is that clients that do not know about the new and special semantics of one of these error codes cannot complete the protocol. This can be desirable in some cases, for example when content must not be delivered if the client cannot provide a supplemental data item (such as an encryption key). In many cases, however, the supplemental data item is optional, and intended to help customize the content at the source. In these cases, this method will needlessly terminate with the error code. Another problem with this error code approach is that intermediate gateways or proxies may attempt to interpret or augment error codes in the server replies, for example by attempting to retrieve the same content from a mirror site, cache, or by forwarding yet another error code (supplying additional error information, for example) to the client.

Another existing approach uses new primitives to request the supplemental information. These new primitives, however, will not be understood (and therefore cannot be processed) by existing clients, again causing termination of the client request without receiving the requested supplemental data. Yet another approach uses a support layer residing under the existing client software, where the support layer implements new protocol extensions for requesting supplemental information. This support layer, which is typically implemented as an application-level proxy, intercepts the protocol extensions, thereby isolating the client's existing software. The layered approach may translate the extensions into primitives that the existing client software can understand, or it may trap the extension for its own local use without forwarding the message on to the client. This approach, however, is problematic in that some of the content sent to a client may use sequence numbers in each response (e.g. for cookie management or other security-related features). The support layer is likely to disrupt the monotonic property of the sequence numbers. Moreover, the support layer must perform data reception, processing, and transmission tasks that slow the content retrieval. Finally, this support layer, being separate from the original browser, creates a maintenance burden on the user who must manage and debug the complex software configuration.

Unfortunately, there is no standard method for the server to verify whether a client is a "standard client" or an "extended client" (i.e. one which understands overloaded error codes, protocol extensions, etc.), in particular once the request is delivered through a complex delivery chain via proxies and possibly transcoders. Thus, the server cannot a priori determine whether to use HTTP in its standard form or with one or more extensions. It is therefore advantageous for any approach which gathers supplemental information through interactions between the client and server to maintain the functionality of the existing communications protocol. This backward compatibility allows the current client software to continue operating while newer versions of client software can recognize and respond to any new protocol functions or extensions.

Accordingly, a need exists for a technique that enables a server to request supplemental information from a client while avoiding the problems which have been discussed for existing approaches. This technique must function within the existing client-server protocol, allowing older versions of the client browser software to operate unchanged while enabling newer versions to recognize and respond to the server's information request.

SUMMARY OF THE INVENTION

An object of the present invention is to provide a technique for enabling a server to request and obtain supplemental information that is not provided in a client's original request.

Another object of the present invention is to provide a technique for enabling a server to provide customized responses to client requests.

Yet another object of the present invention is to provide this technique using existing communications protocols, thereby enabling older client software to continue functioning without changes while enabling newer versions to exploit the technique.

Still yet another object of the present invention is to provide this technique such that a client that does not understand the request for supplemental information does not prematurely terminate the communications.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for use in a computing environment having a connection to a network, for exchanging one or more supplemental information fields between a client and a server. This technique comprises: receiving a client request for a Uniform Resource Locator (URL); determining whether the server can complete the client request; sending a completed response to the client request when the determining has a positive result, wherein the completed response may reflect any available ones of the one or more supplemental information fields; and performing further processing of the client request when the determining has a negative result. This further processing comprises: sending a first REDIRECT message to the client if the client request cannot be completed by the server but can be completed by a different server, wherein the first REDIRECT message specifies a different URL associated with the different server; sending a supplemental information request to the client when any of the one or more supplemental information fields are required before completing the client request; and sending an error message to the client when (1) a predetermined number of attempts by the client to supply the required supplemental information fields have been unsuccessful or (2) the one or more supplemental information fields are not required to complete the client request and the client request cannot be completed by the different server.

Preferably, the sending of a supplemental information request uses a second REDIRECT message which includes a list of the required supplemental information fields encoded in a request header. The second REDIRECT message may use a page permanently moved status code, or a page temporarily moved status code. The second REDIRECT message may use a Hypertext Transfer Protocol, or a Wireless Session Protocol. The second REDIRECT message may specify a target URL which is located on this server, or which is not located on this server.

Optionally, this technique may operate on a proxy server.

The present invention will now be described with reference to the following drawings, in which like reference numbers denote the same element throughout.

DESCRIPTION OF THE PREFERRED EMBODIMENT

Figure 1:
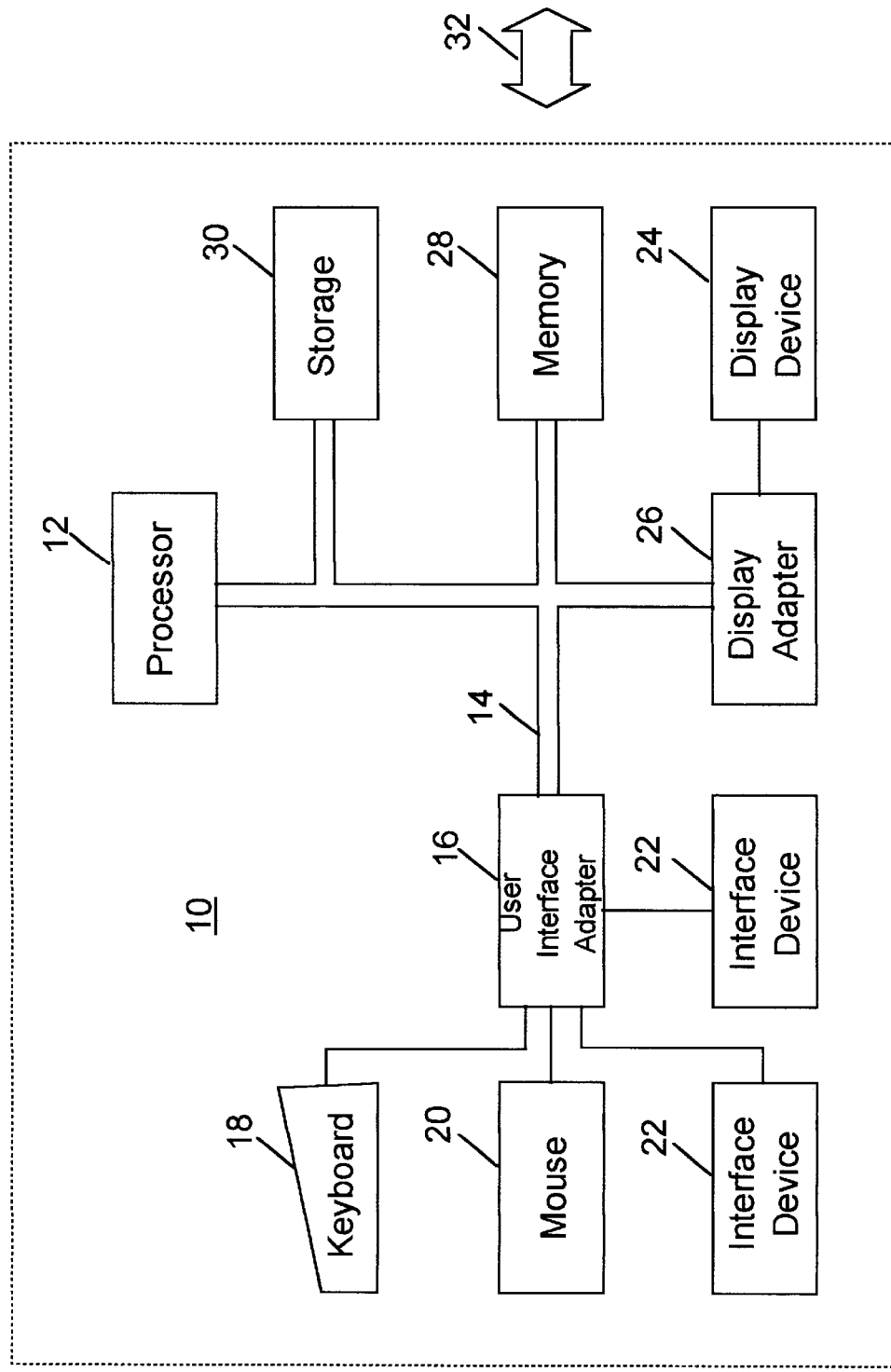
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
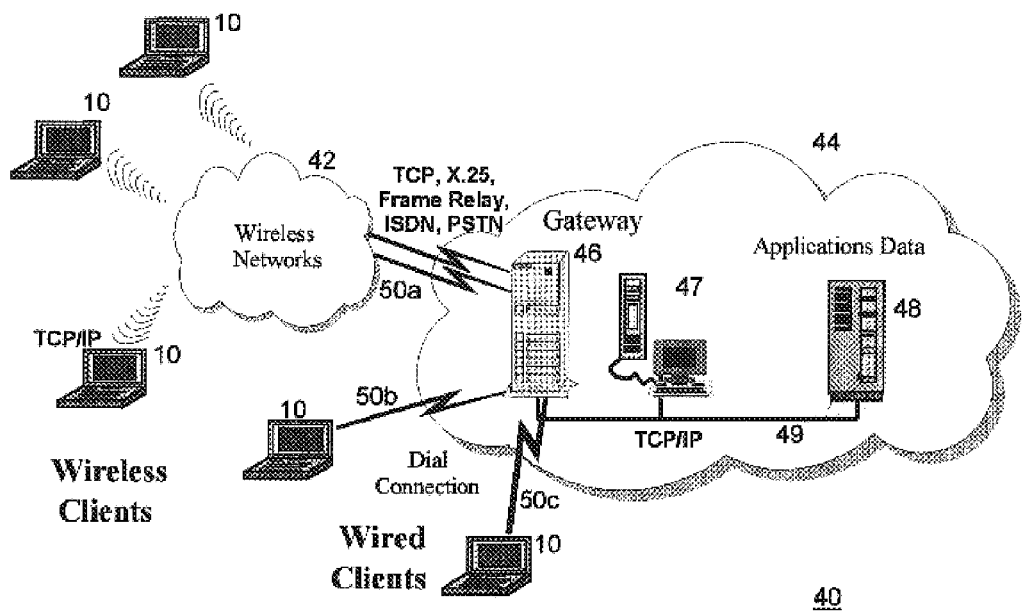
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wired) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiment of the present invention will now be discussed with reference to FIGS. 3 and 4.

In the preferred embodiment, the present invention is implemented as one or more modules (also referred to as code subroutines, or "objects" in object-oriented programming) of a computer software program that resides on a network server. This software will be used where (1) a user interacts with a browser and requests one or more Web pages for access by that browser, and (2) software application(s) running on a server respond to the user's request for Web pages, returning data to the user's browser. In the preferred embodiment, this server is a Web-based server that is communicating with one or more clients using the HTTP or WSP protocol. Typically, this software will be used in an Internet environment. Alternatively, the server may be in a corporate intranet, an extranet, or in any other network environment. Use of the term "Internet" herein includes processing that occurs in these alternative environments, unless otherwise stated.

Figure 3A:
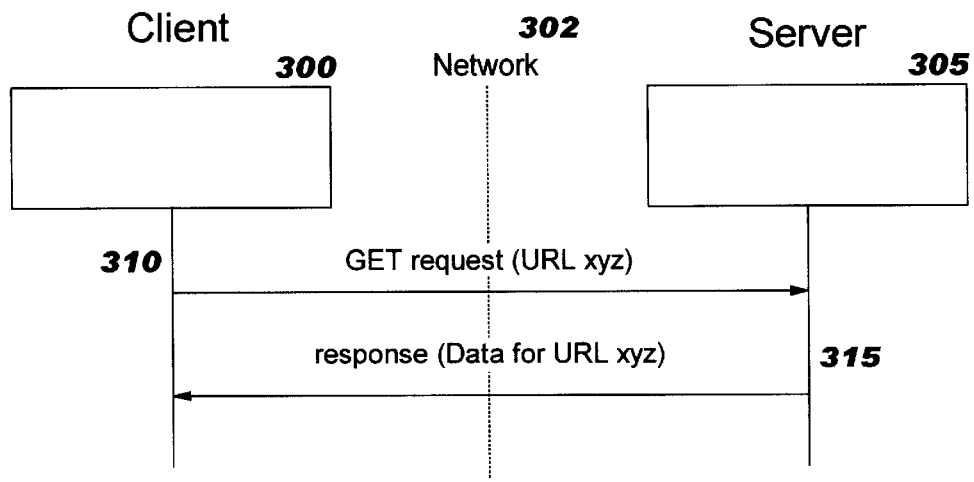
FIG. 3A illustrates message flows between a client and a server according to the prior art.

FIG. 3A illustrates an example of the existing message flows between a client 300 and a server 305 communicating over a network 302 using the HTTP 1.0 or 1.1 protocol. For this example, the client 300 is preferably running one of the commonly available Web browsers such as Netscape Navigator® or Internet Explorer, and the server 305 is a Web server providing Internet services to the client. ("Netscape Navigator" is a registered trademark of Netscape Communications Corporation.) The client machine issues an HTTP GET request 310 which specifies a URL (Uniform Resource Locator) of a requested Web page. For purposes of illustration, the message flow 310 indicates that the URL is "xyz." The server receives this request, and responds to the client at 315 with the data associated with the URL xyz. This is an example of a typical client/server interaction, using message flows which are well known in the art.

According to the present invention, the server application has the ability to process the client request by using supplemental information from the client. It may happen that all this supplemental information is included in the initial client request (e.g. 310 of FIG. 3A). If it is included, the server uses the information to complete a response to the client without requiring use of the present invention. Alternatively, the server may issue a standard REDIRECT to send the client to a different URL for fetching the content. This is prior art (and standard usage of the HTTP protocol). This is the scenario depicted in FIG. 3A. If the supplemental information is not included in the initial client request, however, the server may request 312 additional supplemental information from the client using the inventive concepts disclosed herein, instead of immediately completing the response to the client request. In the preferred embodiment, this is done by sending a REDIRECT response with a request header, where the requested supplemental information is preferably specified as a comma-separated list of attribute names.

Note that while the discussions herein are in terms of a server sending a single REDIRECT message, and the client responding to this message either with sufficient information or not, it may alternatively be desirable in a particular application to allow obtaining the full set of supplemental information fields through more than one such message exchange. When this exchange of multiple REDIRECT messages and multiple client responses is allowed, then two alternatives are possible. Either (1) the server will repeat the full set of attribute names in the request header for each REDIRECT message, in which case the server application does not need to retain values the client has sent in reply headers for interim responses, or (2) the server will maintain the values for those attributes which have been supplied, and request only the additional supplemental fields that are required with any subsequent exchanges. Further, the server application may also maintain additional state information, such as the number of REDIRECT messages that have been sent to a particular client asking for supplemental information. For example, suppose that a server, responding to a client's initial request for content protected with access controls, sends a REDIRECT message to the client with a request header asking for the client's password. The client responds with the password. The server, after receipt of the password information, determines that the password is invalid. The server may elect to send another REDIRECT message, asking again for the client's password. As is well known, it is common practice to give the user some predetermined number of attempts (such as three) to provide a correct password. Therefore the server, in this example, may maintain a count of the number of REDIRECT messages sent to a client asking for the client's password. If the client fails to respond with a valid password after the predetermined number of unsuccessful attempts, the server may take whatever steps are appropriate for this server application (which may include generating an error response, terminating the communications, etc.)

These scenarios where multiple message exchanges may be used to gather supplemental information from a client, with or without maintaining interim state information at the server, as well as the scenario where gathering supplemental information is limited to a single message exchange, are all considered to be within the scope of the present invention.

According to the HTTP 1.1 specification, a client that receives a REDIRECT response issues a subsequent HTTP GET request using the redirected URL that has been supplied with that REDIRECT response. (For additional information on HTTP, refer to RFC 2616, "Hypertext Transfer Protocol—HTTP 1.1" available on the Web at http://www.rfc-editor.org/rfc/rfc2616.txt. For information on equivalent features when using WSP, refer to "Wireless Application Protocol Wireless Session Protocol Specification," available on the Web at http://www.wapforum.org/what/technical1-1/wsp__9-February-1999.pdf.) The additional request header information (and the reply header which will be discussed below) is also a standard part of HTTP. The client will then respond to the request for supplemental information in one of three ways.

Figure 3B:
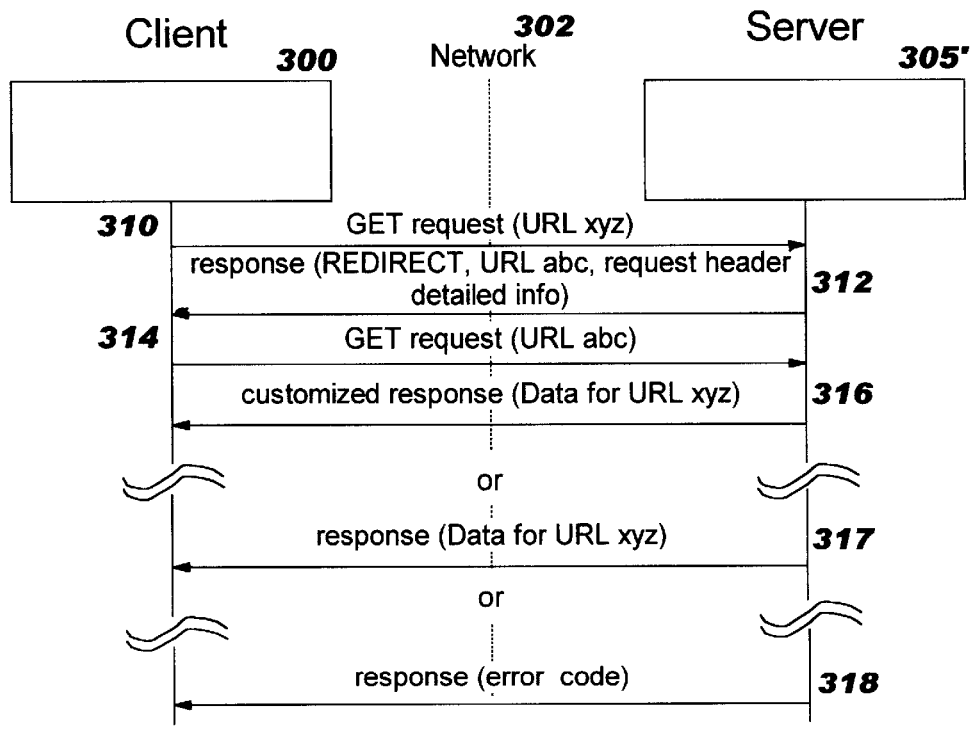
FIGS. 3B, 3C, and 3D illustrate message flows between a client and a server when using the preferred embodiment of the present invention.
Figure 3C:
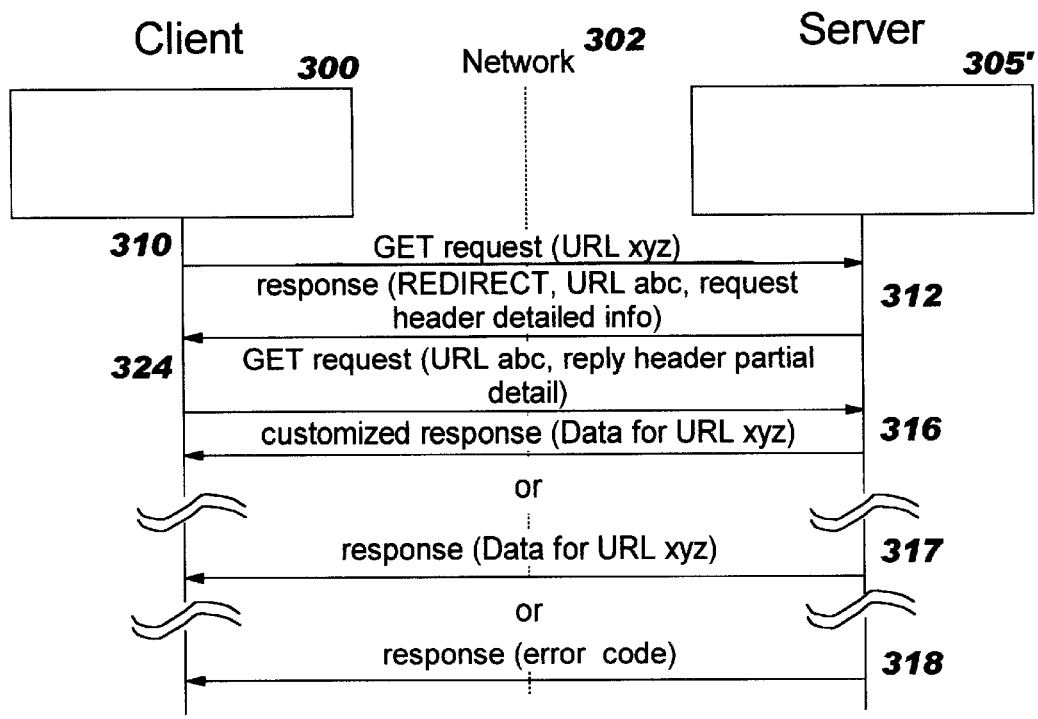
Figure 3D:
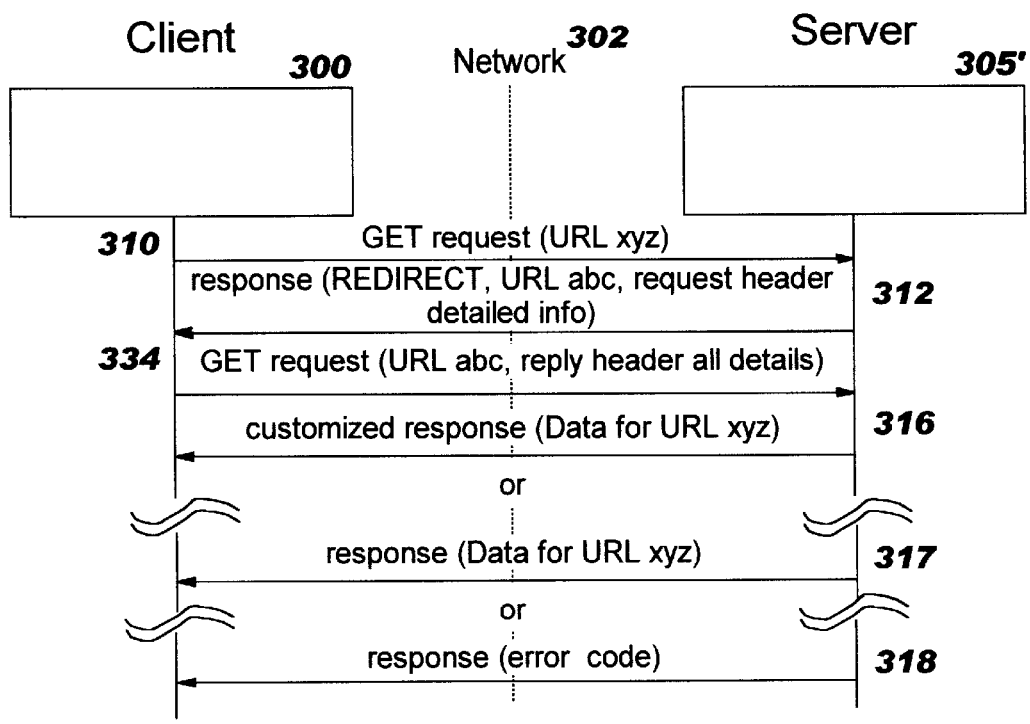

These three alternatives will be discussed with reference to FIGS. 3B–3D. Note that while FIGS. 3B–3D show the client's request 314 for a redirected URL as returning to the same server 305' that issued the REDIRECT message 312, this is for ease of illustration only. It may happen that the redirected URL is located on some server other than server 305', where that other server will then complete the message exchange in the same manner described with reference to server 305'. Note further that while these figures depict a single REDIRECT message 312 sent from the server, and a single client response thereto, multiple such exchanges may actually occur before the server sends a final response (316, 317, or 318) to the client, as has been previously discussed.

In all of these 3 alternatives, the client 300 and server 305' use the HTTP 1.0 or 1.1 protocol as in FIG. 3A. The client issues an HTTP GET request 310 which contains the URL "xyz." The server receives this request as in FIG. 3A, and the present invention is then invoked to process it (as will be discussed below with reference to FIG. 4). The server checks to determine if supplemental information is needed to process this client request. (The situation where supplemental information is not needed is outside the scope of the present invention and is well established in the prior art.) If so, a REDIRECT message 312 is sent to the client. This redirect response contains a redirected URL shown in the example as the URL "abc," and a request header identifying the supplemental information that the server is requesting from the client.

With regard to FIG. 3B, the first way in which a client may respond is for the client to send a subsequent HTTP GET request 314 for the redirected URL specified in the REDIRECT response from the server with no additional supplemental information (i.e without the reply header shown at 324 of FIG. 3C and 334 of FIG. 3D). This response would be expected from an older, back-level client that does not understand the supplemental information request (i.e. the request header shown at 312 of FIG. 3B). When the server receives this request 314, the server application determines if the supplemental information is mandatory. If the missing information is mandatory, then an error code response is sent to the client 318. This would be the case, for example, when a server needed a password for access to a Web page. If, however, the server determines that the missing information is optional, then the server can create a non-customized response 317 to the client request, or perhaps generate a customized response based on pre-determined values or any information otherwise available in the request, and send this response to the client 316. In this manner, the present invention allows current client browser software to continue functioning in an environment where the server implements the present invention, without requiring changes or extensions to the protocol on the client.

With regard to FIG. 3C, a second way in which the client may respond to the server's REDIRECT message 312 is by sending a subsequent HTTP GET request 324 for the redirected URL (as above), which includes a reply header. This reply header, however, contains only a subset of the supplemental information requested by the server. In this case, the client is perhaps capable of providing some of the information, but not all of it, or for some reason has chosen not to respond fully. At that point, the server will determine if the missing information is mandatory. If the information is determined to be mandatory, an error code response 318 is sent to the client; otherwise, the server may create a customized response 316 using the provided subset of the supplemental information, pre-determined values, or any information otherwise available in the request. Alternatively, the server may elect to create a non-customized response 317.

With regard to FIG. 3D, a third possible client response to the server's REDIRECT message 312 is for the client to send the subsequent HTTP GET request 334 for the redirected URL, including a reply header containing all of the requested supplemental information. The server application may then create a customized response 316 using the supplemental information provided. Alternatively, the server may create an error message 318 (e.g. if the supplemental information reveals that the client should not have access to the page) or a non-customized response 317 (e.g. if the server is unable to process the provided supplemental information).

Figure 4:
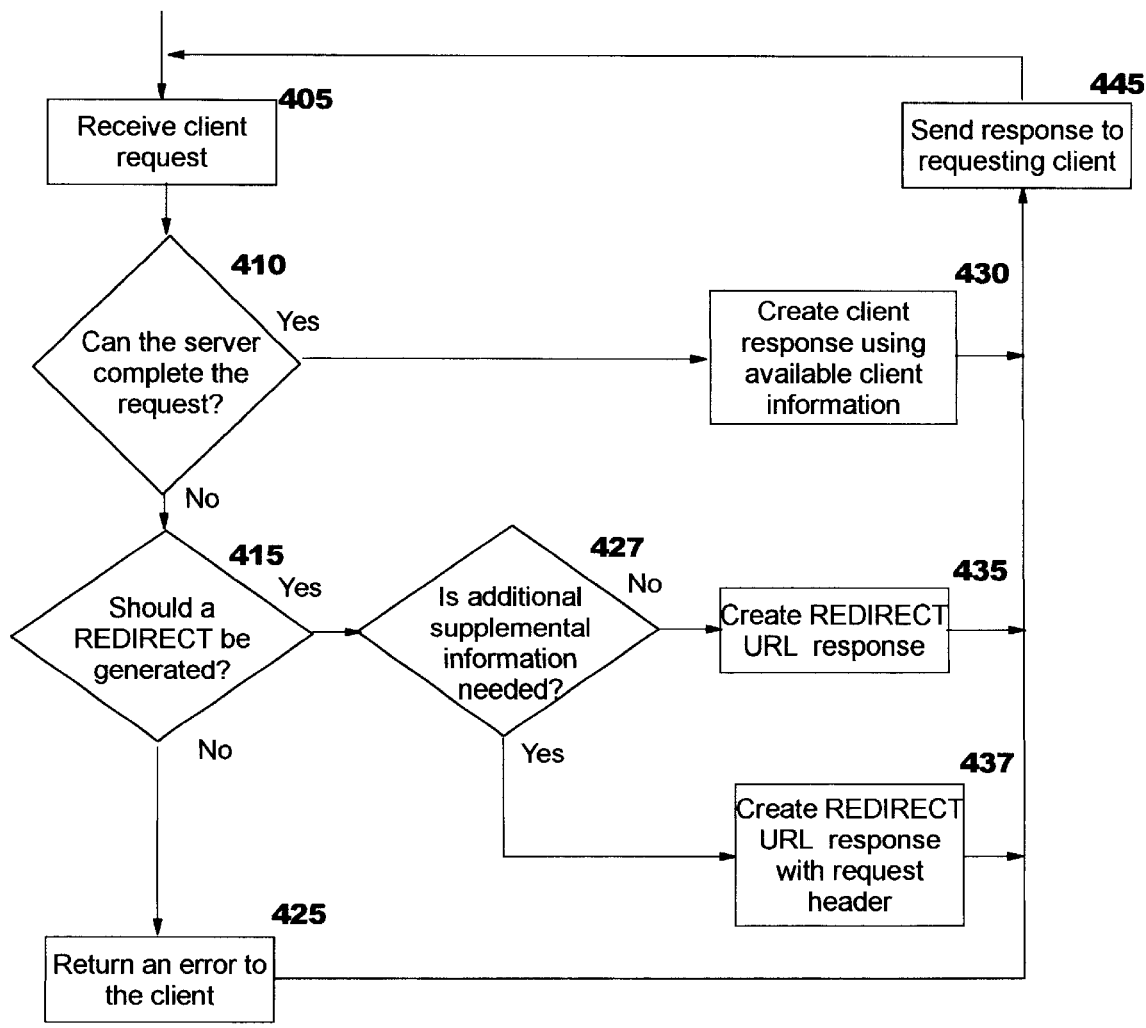
FIG. 4 provides a flowchart depicting the preferred embodiment of the logic used on a server to implement the present invention.

FIG. 4 illustrates the logic used to implement the preferred embodiment of the present invention. This implementation preferably executes on the content server machine participating in a client-server communication. Alternatively, this logic may execute on a server-side proxy or an intermediate proxy. In addition, the logic of the preferred embodiment may be functionally split between more than one server machine—e.g. with one machine handling the original URL and another machine handling the redirected URL(s).

The processing of FIG. 4 begins at Block 405, where the server receives a request for Web content from a client. In the preferred embodiment, this request is a typical HTTP GET request (according to the prior art) containing, among other information, the requested URL (see, e.g., 310 of FIG. 3B). The request may optionally include supplemental information fields for use by the server. The URL in this request may originate from a variety of sources, including direct input from the user of the client machine, user selection from a list of URLs, automated generation by an application running on the client machine, etc. In addition, it may be the URL supplied by the server on a REDIRECT message (such as 312 of FIGS. 3B–3D). The server at Block 410 checks the client request to see if the server can complete the response with the available information. This processing handles the case where no supplemental information was required, as well as where sufficient information is available to enable the server to create a response. Sufficient information, in this case, means that the server has any supplemental information from the client which is deemed to be mandatory for completing the client's request. Optionally, the server application may (when appropriate, according to the application requirements) use pre-determined values or any information otherwise available for completing the client request. Further, if validation of the information provided is required (e.g. verifying a password for access control purposes), a successful result to the validation process is considered part of the check performed at Block 410. The check at Block 410 also comprises determining whether the requested content is available from this server. For example, the server may have received all the mandatory supplemental information, and any required validation of these values may have succeeded, indicating that the requested content should be delivered to the client. If that content is available from a URL at a different server, however, Block 410 will have a negative result (and the client will be redirected to the appropriate URL by Blocks 415 and 435).

If the server can complete the client request, processing continues at Block 430 where the server creates a response to the client request using the available client information, as appropriate. This response may be a customized response, if the server application determined that enough supplemental information was available, or a non-customized response. This response is sent to the client at Block 445. If the request cannot be completed at Block 410, then processing continues to Block 415.

At Block 415, the server determines whether the client should be redirected to a different URL. When supplemental information is needed by the server before completing the client's request, then Block 415 has a positive result. Block 415 also has a positive result when no supplemental information is needed, but the requested content must be obtained from a different URL. This different URL may exist on the current server or on another server. (As has been discussed, the server application may use more than one server to respond to client requests, such as receiving the client request on one server and using other content servers for content delivery.) In an optional aspect of the preferred embodiment, the server application at Block 415 may use state information related to the client request to determine if a REDIRECT message to another URL should be sent. This state information, for example, may include the number of REDIRECT messages previously sent to this client, such that once a pre-determined limit has been reached, the server may elect not to send another REDIRECT message (i.e. forcing the answer to Block 415 to "No").

If the answer to the decision at Block 415 is "Yes," then at Block 427, the server determines if additional supplemental information is needed from the client before completing this request. If no additional supplemental information is needed, then processing continues to Block 435 where a REDIRECT response is created including the redirected URL. In the case of HTTP, preferably, the "page temporarily moved" REDIRECT status code 302 will be used. Alternatively, a REDIRECT status code such as 301 "page permanently moved" may be used. Then, at Block 445, the response is sent to the client. If, at Block 427, additional supplemental information is needed from the client, then at Block 437 the server creates the REDIRECT response including (1) the redirected URL and (2) a request header identifying the supplemental information needed. (As discussed earlier, in the preferred embodiment the supplemental information will be requested using a comma-separated list of attribute names in the request header. The specific syntax of the individual attribute names is outside the scope of the present invention.) At Block 445, this REDIRECT message with the request header is sent to the client.

Returning to Block 415, if the server determines that no REDIRECT message should be generated, then processing continues to Block 425. This will be the case when (1) the server cannot or will not complete the request ("No" at Block 410), and (2) sending a REDIRECT message is not an appropriate choice (e.g. based on the application's criteria, such as limiting the number of password attempts as discussed earlier). At Block 425, the server creates an error response which is sent to the client at Block 445.

As discussed earlier, at Block 445 the server sends the response to the client. When the client receives a REDIRECT response, the client responds in one of the three ways described earlier with reference to FIGS. 3B–3D.

After the server sends a response at Block 445, processing returns to Block 405 to wait for another client request.

In an alternative embodiment, the server application responds to the client request with a REDIRECT for the same URL requested by the client. With regard to FIG. 3D, the redirect response 312 to the client would include the "xyz" URL instead of the "abc" URL. The subsequent client request 334 would be issued for the "xyz" URL including the reply header for the supplemental information. As discussed earlier with regard to maintaining state information, this alternative embodiment preferably uses additional logic in the server application to preserve information from the original request from the client 310 so that, at Block 415 of FIG. 4, the server application knows that the request for URL "xyz" is a response to a previous redirect for the same URL ("xyz").

Since processing the REDIRECT response is a required part of the HTTP protocol, no client side software modification is required for the present invention. This allows any computer, including small, limited function computers, to continue operating with the present invention without the burden of installing, storing, or executing additional software. In addition, as the wide diversity of client devices continues to grow, more server applications can be used that customize responses for the unique characteristics of these new devices. For example, a wireless user may have a new, hand-held device that displays the latest news on request. If the client provides supplemental information to a server application using the present invention, the server application may recognize the limitations of the client device, and may remove all images if the client device cannot process them. Or, the client may use supplemental information to inform the server of its last-received news item, so that the server will only send news items not yet presented to this specific user. This results in a reduction of the amount of data sent to the client, shortening the overall response time as well as reducing the client's connection costs.

The present invention may alternatively operate on a server-side proxy (or any intermediate proxy which does not reside on the client), using an extension of the logic illustrated in FIG. 4. This extension comprises a proxy performing the functions as discussed for FIG. 4, with the addition of the proxy communicating with the content server when the response will include content from the requested URL (i.e. the proxy is not sending an error code). If an error code response is created (at Block 425), the response to the client is sent at Block 445 with no interaction with the content server. If, however, the proxy has collected any needed supplemental information and is creating a response (Block 430), the proxy would then request the Web page from the appropriate content server prior to creating the response. It will be obvious to one of ordinary skill in the art how this additional processing may be added prior to Block 430 of FIG. 4.

While the preferred embodiment has been discussed in terms of using the HTTP 1.1 and WSP protocols, other protocols providing similar function may be used without deviating from the inventive concepts disclosed herein. Further, while the preferred embodiment has been described as using the REDIRECT response, other responses may be used alternatively which provide similar semantics as the REDIRECT response. As described above with reference to redirection, processing the redirection status codes is a required part of the HTTP protocol, and thus requires no client-side software modification.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A method in a computing environment connected to a network, for obtain supplemental information from a client, comprising the steps of:

receiving a request, for content located at a Uniform Resource Locator (URL), sent from said client to a server;

determining whether said server needs supplemental information from said client before completing said request;

processing said request and sending, to said client, a completed response containing said requested content when said determining step has a negative result; and obtaining said supplemental information from said client when said determining step has a positive result, further comprising the steps of:

generating a request header specifying one or more supplemental information field(s) to be used for requesting said supplemental information from said client;

embedding said generated request header in a REDIRECT response message created to respond to said request, wherein said REDIRECT response message is defined in a standards-based communications protocol operating between said client and said server but is not designed for requesting supplemental information from clients; and sending said REDIRECT response message with said embedded request header to said client, wherein: (1) said client will automatically send a subsequent request, responsive to receiving said sent REDIRECT response message with said embedded request header, according to said standards-based communications protocol; and (2) said automatically sent sequent request from said client will include a reply header containing said client's response to at least a portion of said requested additional information if said client is adapted for processing said supplemental information field(s) specified in said request header but will ignore said supplemental information field(s) otherwise.

2. The method according to claim 1, wherein said REDIRECT response message uses a page permanently moved status code.

3. The method according to claim 1, wherein said REDIRECT response message use a page temporarily moved status code.

4. The method according to claim 1, wherein said standards-based communications protocol is Hypertext Transfer Protocol.

5. The method according to claim 1, wherein said standards-based communications protocol is Wireless Session Protocol.

6. The method according to claim 1, wherein said method operates on a proxy server.

7. The method according to claim 1, wherein said REDIRECT response message specifies a target URL which is located on said server.

8. The method according to claim 1, wherein said REDIRECT response message specifies a target URL which is not located on said server.

9. A system in a computing environment connected to a network, for obtaining supplemental information from a client, comprising:

means for receiving a request, for content heated at a Uniform Resource Locator (URL), sent from said client to a server;

means for determining whether said server needs supplemental information from said client before completing said request;

means for processing said request and sending, to said client, a completed response containing said requested content when said means for determining has a negative result; and means for obtaining said supplemental information from said client when said means for determining has a positive result, further comprising:

means for generating a request header specifying one or more supplemental information field(s) to be used for requesting said supplemental information from said client;

means for embedding said generated request header in a REDIRECT response message created to respond to said request, wherein said REDIRECT response message is defined in a standards-based communications protocol operating between said client and said server but is not designed for requesting supplemental information from clients; and means for sending said REDIRECT response message with said embedded request to said client, wherein: (1) said client will automatically send a subsequent request, responsive to receiving said REDIRECT response message with said embedded request header, according to said standards-based communications protocol; and (2) said automatically sent subsequent response from said client will include a reply header containing said client's response to at least a portion of said requested additional information if said client is adapted for processing said supplemental information field(s) specified in said request header but will ignore said supplemental information field(s) otherwise.

10. The system according to claim 9, wherein said REDIRECT response message uses a page permanently moved status code.

11. The system according to claim 9, wherein said REDIRECT response a uses a page temporarily moved status code.

12. The system according to claim 9, wherein said standards-based communications protocol is Hypertext Transfer Protocol.

13. The system according to claim 9, wherein said standards-based communications protocol is Wireless Session Protocol.

14. The system according to claim 9, wherein said system operates on a proxy server.

15. The system according to claim 9, wherein said REDIRECT response message specifies a target URL which is located on said server.

16. The system according to claim 9, wherein said REDIRECT response message specifies a target URL which is not located on said server.

17. A computer program product embodied on a computer readable medium readable by a computer in a computing environment connected to a network, for obtaining supplemental information from a client, comprising:

computer readable program code means for receiving a request, for content located at a Uniform Resource Locator (URL), sent from said client to a server;

computer readable program code means for determining whether said server needs supplemental information from said client before completing said request;

computer readable program code means for processing said request and sending, to said client, a completed response containing said requested content when said computer readable program code mean for determining has a negative result; and computer readable program code means for obtaining said supplemental information from said client when said computer readable program code means for determining has a positive result, further comprising:

computer readable program code means for generating a request header specifying one or more supplemental information field(s) to be used for requesting said supplemental information from said client;

computer readable program code means for embedding said generated request header in a REDIRECT response message created to respond to said request, wherein said REDIRECT response message is defined in a standards-based communications protocol operating between said client and said server but is not designed for requesting supplemental information from clients; and computer readable program code means for sending said REDIRECT response message with said embedded request header to said client, wherein: (1) said client will automatically send a subsequent request, responsive to receiving said sent REDIRECT response message with said embedded request header, according to said standards-based commons protocol; and (2) said automatically sent subsequent request from said client will include a reply header containing said client's response to at least a portion of said requested additional information if said client is adapted for processing said supplemental information field(s) specified in said request header but will ignore said supplemental information field(s) otherwise.

18. The computer program product according to claim 17, wherein said REDIRECT response message uses a page permanently moved status code.

19. The computer program product according to claim 17, wherein said REDIRECT response message uses a page temporarily moved status code.

20. The computer program product according to claim 17, wherein said standards-based communications protocol is Hypertext Transfer Protocol.

21. The computer program product according to claim 17, wherein said standards-based communications protocol is Wireless Session Protocol.

22. The computer program product according to claim 17, wherein said computer operates as a proxy server.

23. The computer program product according to claim 17, wherein said REDIRECT response message specifies a target URL which is located on said server.

24. The computer program product according to claim 17, wherein said REDIRECT response message specifies a target URL which is not located on said server.

* * * * *